Aug. 10, 1954     D. R. LEWIS     2,686,068
SEALING DEVICE
Filed April 27, 1950     5 Sheets-Sheet 1
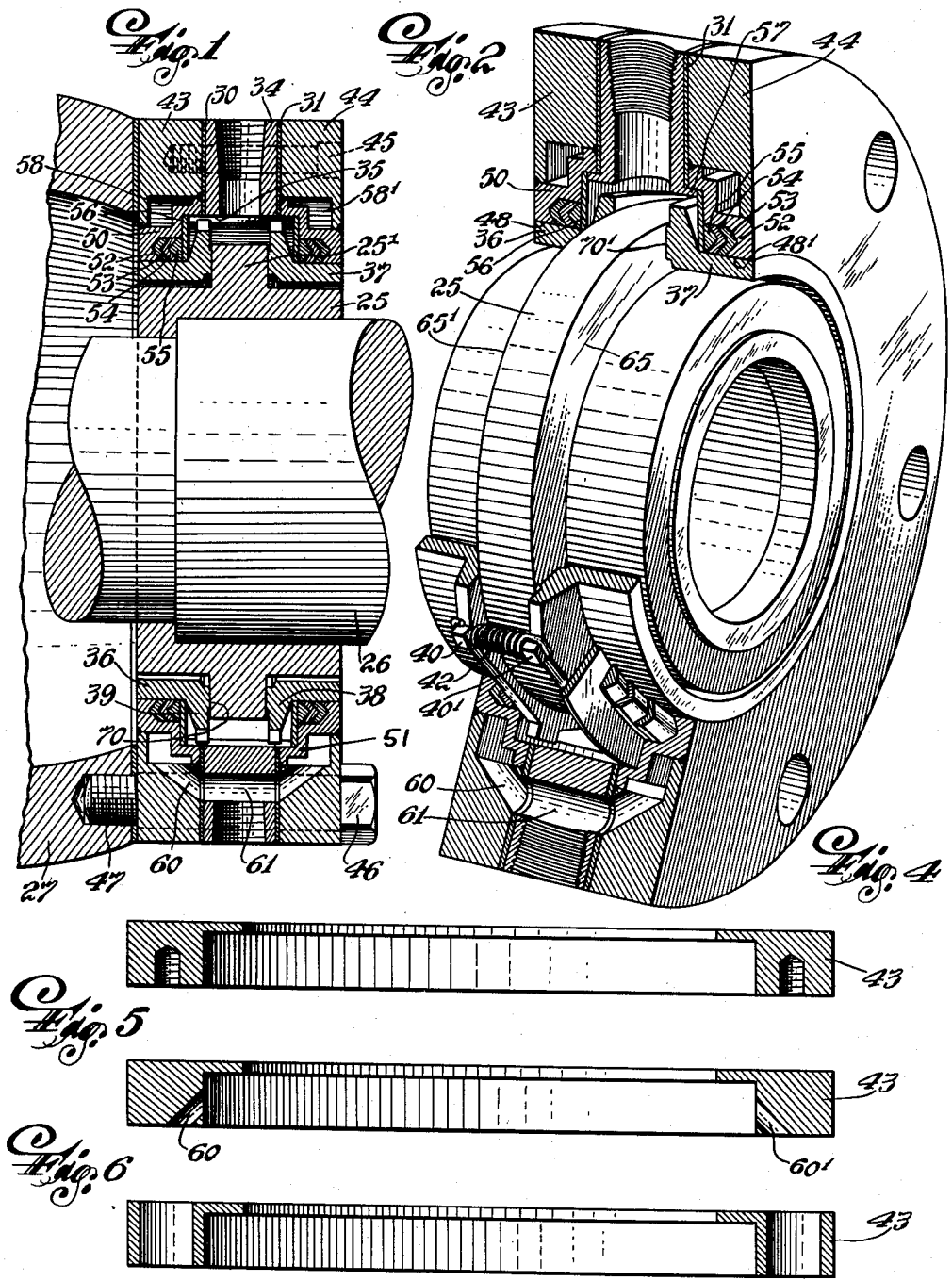
INVENTOR.
Douglas R. Lewis
BY
ATTORNEY Aug. 10, 1954     D. R. LEWIS     2,686,068
SEALING DEVICE
Filed April 27, 1950     5 Sheets-Sheet 2
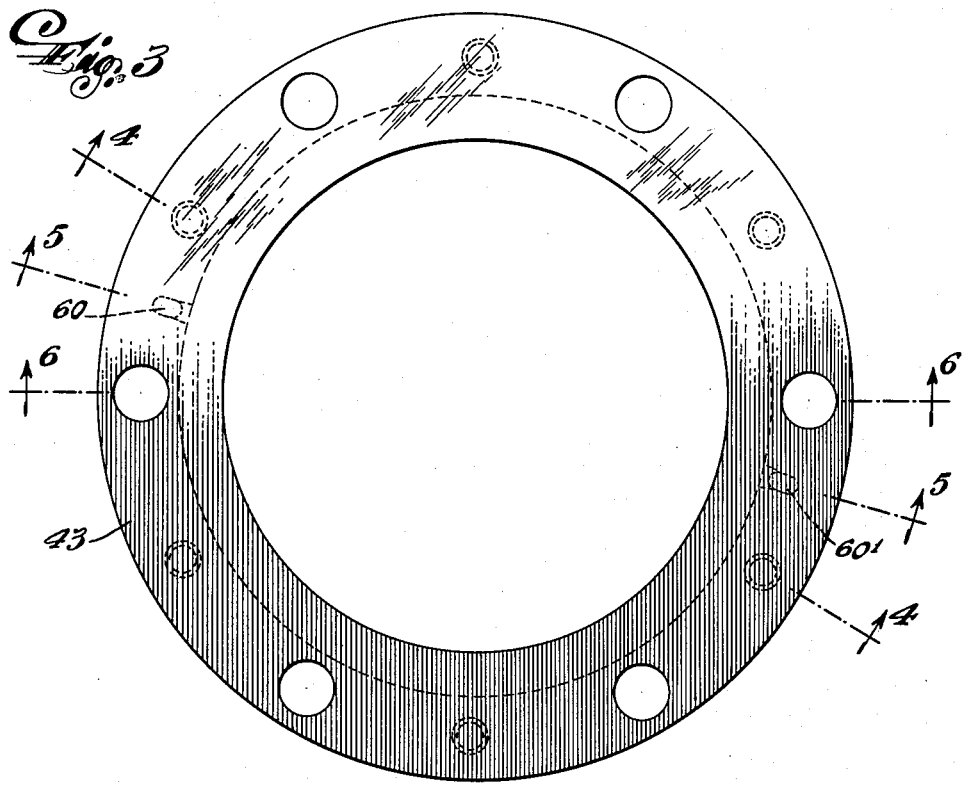
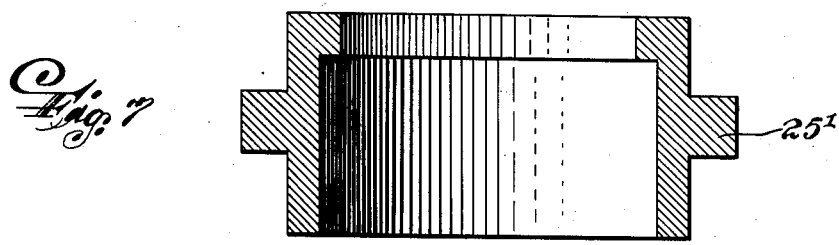
INVENTOR.
Douglas R. Lewis
BY
ATTORNEY Aug. 10, 1954
D. R. LEWIS
2,686,068
SEALING DEVICE
Filed April 27, 1950
5 Sheets-Sheet 3
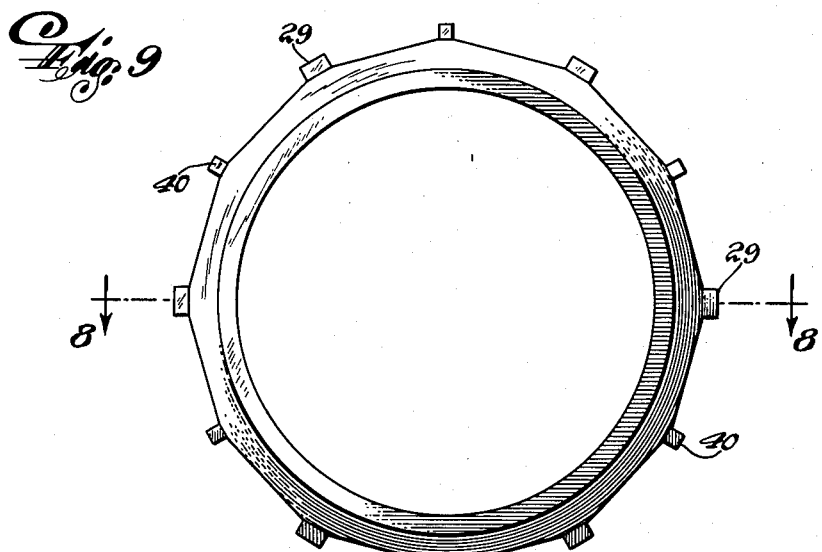
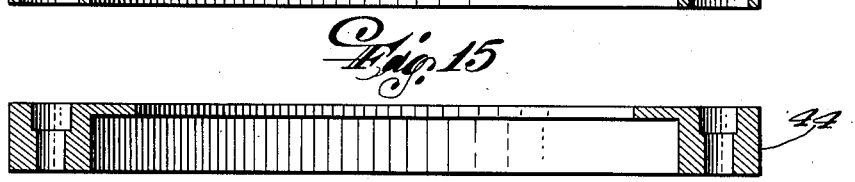
INVENTOR.
Douglas R. Lewis
BY
ATTORNEY Aug. 10, 1954     D. R. LEWIS     2,686,068
SEALING DEVICE
Filed April 27, 1950     5 Sheets-Sheet 4
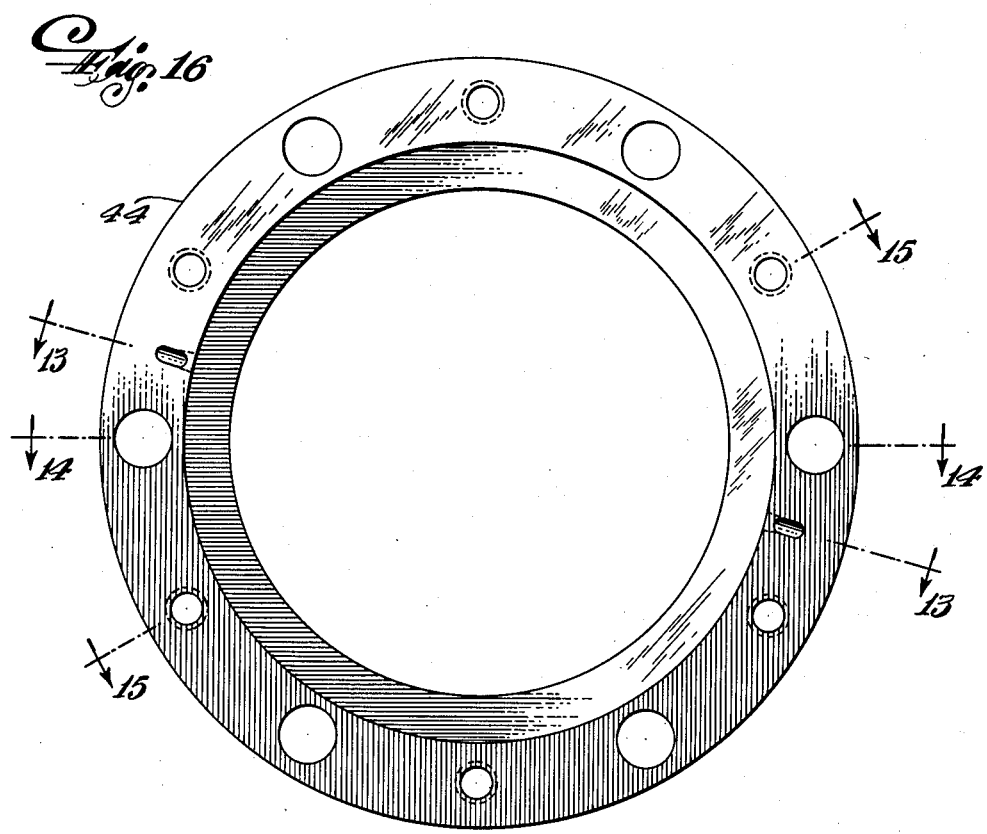
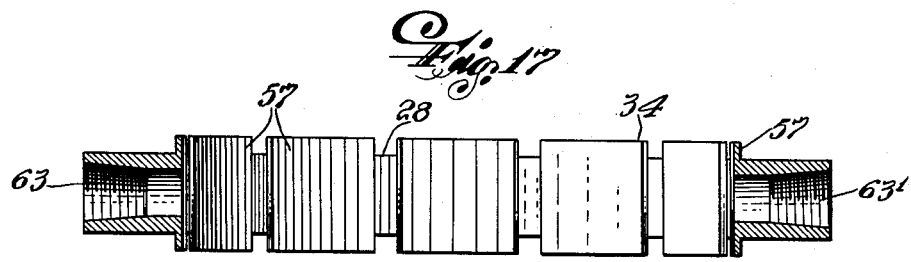
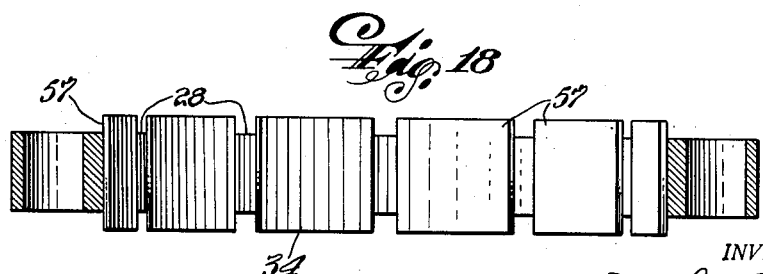
INVENTOR.
Douglas R. Lewis
BY
ATTORNEY Aug. 10, 1954 D. R. LEWIS 2,686,068
SEALING DEVICE
Filed April 27, 1950 5 Sheets-Sheet 5
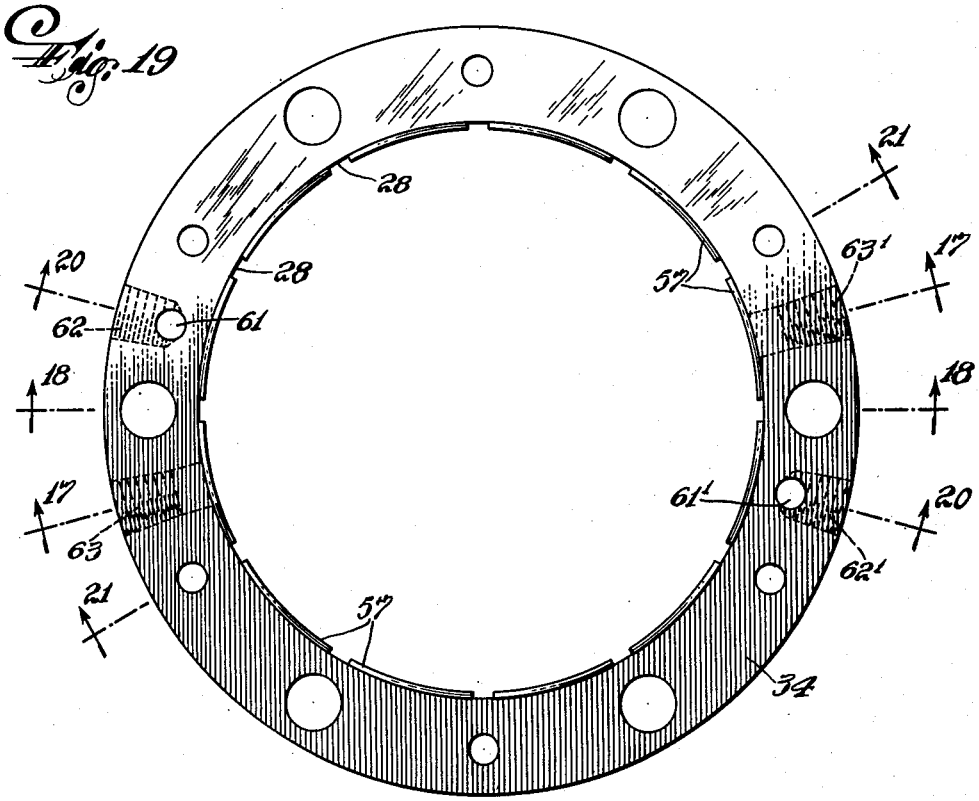
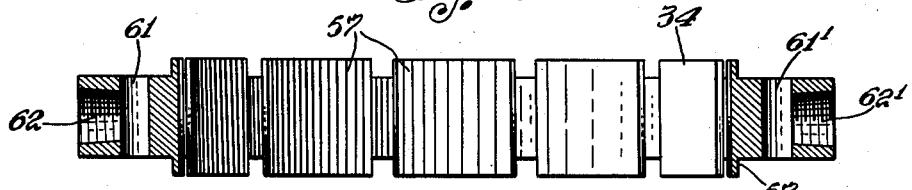
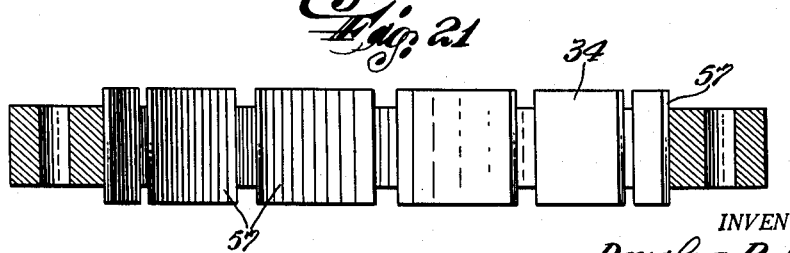
INVENTOR.
Douglas R. Lewis
BY
ATTORNEY

Patented Aug. 10, 1954

2,686,068

UNITED STATES PATENT OFFICE 2,686,068

SEALING DEVICE

Douglas R. Lewis, Summit, N. J., assignor, by mesne assignments, to The Viscoseal Corporation, Union, N. J., a corporation of New Jersey Application April 27, 1950, Serial No. 158,370

1 Claim. (Cl. 286—11.14)

This invention relates to a device for sealing a rotor in an object, said device incorporating self-aligning features of construction designed to maintain a constant seal of the rotor in operation.

A further object of the invention is to provide a sealing device of novel structural features which enables the same to be readily applied to and removed from objects to be sealed and sources and apparatus for sealing.

These and other advantageous objects, which will appear from the drawings, and from the description hereinafter, are accomplished by the structure of my invention, of which an embodiment is illustrated in the drawings. It will be apparent, from a consideration of said drawings, and the following description, that the invention may be embodied in other forms suggested thereby, and such other forms, as set forth in the terms of the appended claims, are to be considered within the scope and purview of the instant invention.

In the drawings:

Fig. 1 is a vertical sectional view, partly fragmentary, of a sealing device embodying my invention, shown applied to an object 27 to seal the shaft 26 therein, said view being taken on a line generally corresponding to that on which Fig. 2 is taken, Fig. 2 is a perspective, partly fragmentary, view of the sealing device, Fig. 3 is a plan view of one of the wall members comprising the housing of said device, Fig. 4 is a cross-sectional view thereof, taken on line 4—4 of Fig. 3, Fig. 5 is a similar view thereof, taken on line 5—5 of Fig. 3, Fig. 6 is a similar view thereof, taken on line 6—6 of Fig. 3, Fig. 7 is a cross-sectional view of the rotor forming part of the device of my invention, Fig. 8 is a cross-sectional view of the stator ring forming part of the device of my invention, taken on line 8—8 of Fig. 9, Fig. 9 is a plan view of said stator ring, Fig. 10 is a cross-sectional view of a sealing ring used in connection with said device, Fig. 11 is a cross-sectional view of the adapter used in connection with said device, Fig. 12 is a cross-sectional view of the liner forming part of the wall members 43 and 44, Figs. 13, 14 and 15 are cross-sectional views of the wall member 44, taken on lines 13—13, 14—14 and 15—15 respectively, of Fig. 16, Fig. 16 is a plan view of said wall member, Fig. 17 is a cross-sectional view of barrel member 34, taken on line 17—17 of Fig. 19, Fig. 18 is a similar view, taken on line 18—18 of Fig. 19, Fig. 19 is a plan view of barrel member 34, Fig. 20 is a cross-sectional view thereof, taken on line 20—20 of Fig. 19, and Fig. 21 is a cross-sectional view thereof, taken on line 21—21 of Fig. 19.

As shown in the drawings, the device of my invention is adapted to seal a rotor in an object; the latter, which is indicated fragmentarily in Fig. 1 and designated by reference numeral 27, may be any vessel or other object in which the rotor is to be sealed. The rotor may be any rotating part such as, for example, that designated by the reference numeral 26 in Fig. 1. It will be understood that the device is adapted to be secured to any article for the purpose of sealing a rotating member thereto. Accordingly, the term "rotor" as used herein shall be deemed to include any moving or rotating object, whether driven by rotating shaft or other source or means, and without regard to the specific method of securing the same to the source of power.

As shown in the drawings, the device of my invention comprises a housing secured to the object 27 by any convenient means, as, for example (Fig. 1), by bolt members 46 passing through the housing and engaging threaded recesses 47 in the object 27. The housing consists of a wall member 43 and a second wall member 44 which is substantially identical thereto; a description of one of the wall members will, therefore, suffice for both. A barrel 34 is disposed between the wall members, the barrel having a medial opening 35 in which the rotor may be rotated. The wall members have registering medial openings 48, 48' (Fig. 2). Bolt or similar means 45 may be used to secure barrel 34 and wall members 43 and 44, comprising the housing parts together. Sealing rings 53, 54 of complementary nesting cross-section and outline are positioned in the V-shaped recesses 52 of liners 50 which may be welded to the wall members so as to form, essentially, a part of said wall members in registry with the medial openings therein; identical stator rings 36 and 37 are positioned in the medial openings in the wall members for engagement with the seal rotor 25 and with the sealing rings.

The barrel 34 and stator rings are provided with complementary keying means to key the stator rings in the barrel, to enable the stator rings to slide toward one another in one plane, while keying them against movement at right angles to said plane. As shown in Figs. 18 and 19, the barrel 34 is provided with keyways 28 to receive the keys 29 (Fig. 9) on stator rings 36 and 37. The stator rings are L-shaped in cross-section, having leg portions 38 and 39 (Fig. 1), presenting inner faces for engagement with the faces 65, 65' of seal rotor 25. Said stator rings are further provided with studs 40, 40' to receive the ends of springs 42 or other tension means to urge said stator rings toward each other and into engagement with the faces of the rotor. The studs are received in the alternate keyways 28 of barrel 34 in the arrangement shown in Fig. 2. The spring or other tension means 42 may be otherwise secured to the stators 36, 37, if desired. A liner 50 (Figs. 1 and 12) is welded to the wall member 43 or otherwise formed integral therewith or united thereto so as to define an internal heat exchange passage or chamber 58 in wall member 43. A corresponding arrangement is provided in the other wall member 44 to provide the heat exchange passage or chamber 58' therein. Said passage is thus a sealed one except at diametrically opposed points 60, 60' (Figs. 3 and 5) wherein apertures 60, 60' open into said passage. Said apertures are angularly inclined; in the assembly of the device, they register with apertures 61, 61' in the barrel 34 (Figs. 1, 19 and 20) to provide a continuous passage between the heat exchange chambers 58, 58' of the wall members through the barrel 34. The lower (liner) end 50 of the wall member 43 defines a ring portion provided with a V-shaped recess 52 (Fig. 1) to receive the V-sealing rings 53, 54 and adapter 55 positioned against the sealing rings. A "belleville spring washer" or the like 56 is clamped between the shoulder portions 57 of barrel 34 and the adapter 55 (Figs. 2 and 11) to hold the sealing rings therein. The barrel 34 is provided with a pair of diametrically opposed threaded apertures 62, 62' communicating with the apertures 61, 61' (Fig. 20) for connection with an external source of supply (not shown). By this arrangement, a heat exchange medium, such as water, gas, oil, or the like, may be circulated through the chambers 58, 58' of wall members 43, 44. A second pair of threaded apertures 63, 63' provided in the barrel 34 (Fig. 19) pass completely through the barrel. By this arrangement, an external source of fluid may be connected to the device for communication with the opening 35 of the barrel wherein the seal rotor 25 rotates. The barrel 34 at the open portion 35 thereof is provided (as above noted) with a plurality of spaced slits 28 for the alternate reception of the upstanding keys 29 on the stator ring 36 and the integral studs 40 which receive the ends of the spring 42; thus, the stator rings are urged into constant contact with the faces 65, 65' of the rotor under tension. By this arrangement, the stator rings may slide in the barrel 34 while maintaining a sealing contact with the sealing rings 53, 54 of the wall members 43, 44.

Gaskets 30, 31 (Fig. 1) may be interposed between the barrel 34 and wall members 43, 44.

The present invention provides an essentially one-piece sealing device consisting of a stationary ring of U-shaped cross-section (43, 34 and 44), defining an internal bore or cavity 35 in which part (25) of the sealing device may be rotated. The seal rotor 25 may, as shown in Fig. 1, be a flange on a sleeve which is adapted to be secured against the shoulder of the shaft (26) by the user. The sealing device just described may be manufactured, factory assembled and shipped as a complete unit to be attached by the user as a unitary sealing device to shaft 26 or other object to be sealed in a pressure vessel 27 or the like, the device being secured to the pressure vessel by bolts or the like (46).

The object of the invention is to seal the rotating shaft to the pressure vessel. The wall 65' of the rotor 25 and the face of leg portion 39 of stator ring 36 (Fig. 1) define an interface 70 (Fig. 1). That portion of cavity 35 not occupied by rotating flange 25 is filled with a fluid or sealant, such as oil, having, among other characteristics, good "sealability," selected for the requirements of the particular application involved, and may then be closed by plugs or the like threaded into one or more openings as, for example, the oppositely disposed threaded apertures 63, 63' (Fig. 19). By this arrangement, I have found, in practice, that pressures in the vessel and cavity will be automatically in equilibrium; this has been indicated by the use of gauges and other testing equipment. It is believed that this end is attained, in the use of my invention, as follows: A higher pressure in the pressure vessel than in the cavity 35 causes a very minute penetration of the fluid in the pressure vessel across the interface 70, raising the pressure in the cavity 35 until there is no pressure drop across the interface 70—that is, until equilibrium of pressure in vessel 27 and cavity 35 is attained. Probably a very slight axial separation of the stator 36 and flange 25 occurs to permit the very slight penetration across the high pressure interface 70 just referred to, such penetration being only of a very minute order. It was observed that the time lag for attainment of equilibrium of the pressures in vessel 27 and cavity 35 was inversely proportional to the extent to which cavity 35 was completely filled with the sealant. If the pressure in vessel 27 falls below that in cavity 35, the net thrust of the stator ring against the rotor ring at interface 70 is always in the direction which will hold the stator ring tightly against the rotor ring with a force directly proportional to the sealing fluid pressure. This result is obtained by proper proportioning of the effective area of slanting surface of leg 39 and the area of contact at interface 70. There is a full pressure drop across the interface 70' defined by the wall 65 of the seal rotor toward the atmosphere or away from the vessel 27 and the face of leg portion 39 of stator ring 37. But since the sealant with which cavity 35 is initially filled is selected for its high sealability, there is very little or practically no leakage of sealant due to the pressure drop at interface 70'.

This is best illustrated by the fact that the device without being mounted on any shaft or on any pressure vessel may be pressurized by filling the cavity 35 with a sealing fluid of proper characteristics and pumping it up with a small hand pump through a shut-off valve. After pressurizing, the valve may be closed, the pump disconnected, and the pressure, as read on a gage connected to the cavity, remains unchanged until relieved by opening the valve. An external source of fluid may be connected to the threaded apertures 63, 63' for connection with cavity 35 of the barrel 34 to provide a pressure greater than that in the vessel 27. However, there is considerable practical objection to the use of any device auxiliary or supplementary to a sealing device. Such auxiliary or supplementary devices, as heretofore proposed in the art, have been quite complex.

The sealing device of the instant invention may have such auxiliary or supplementary devices connected thereto. However, it has proved highly effective without the use of such external pressure sources. By simply filling the portion of cavity 35 not occupied by rotating flange 25' with a sealant, such as oil, as above noted, the device thereafter automatically maintains equilibrium of pressure in the vessel 27 and cavity 35.

Having thus described my invention, what I claim as new and desire to secure by Letters Patent is:

In a device for sealing a flanged member in the opening of a housing, said housing having a recess, a sealing ring positioned in said recess, a stator ring positioned in the opening of the housing, said stator ring having a face for engagement with the flanged member, and a part for engagement with the sealing ring, a spring washer engaging the sealing ring and also engaging portions of the stator ring and housing, said housing having a shoulder, said stator ring part comprising a slanting surface and a non-slanting surface defining a shoulder at their meeting points, said portions of the stator ring and housing engaged by the spring washer being the mentioned housing shoulder and shoulder of the stator ring part.

References Cited in the file of this patent

UNITED STATES PATENTS

| Number | Name | Date |
|---|---|---|
| 1,927,543 | Doyle | Sept. 19, 1933 |
| 2,220,771 | McHugh | Nov. 5, 1940 |
| 2,233,599 | Gilbert | Mar. 4, 1941 |
| 2,265,953 | Mortensen et al. | Dec. 9, 1941 |
| 2,276,406 | Magrum | Mar. 17, 1942 |
| 2,321,871 | Stevenson | June 15, 1943 |
| 2,470,419 | Voytech | May 17, 1949 |
| 2,531,079 | Payne | Nov. 21, 1950 |
| 2,555,492 | Kidney | June 5, 1951 |
| 2,567,809 | Greiner | Sept. 11, 1951 |

FOREIGN PATENTS

| Number | Country | Date |
|---|---|---|
| 503,149 | Great Britain | of 1939 |
| 714,377 | Great Britain | of 1941 |